US011092703B2

(12) United States Patent
Roberts

(10) Patent No.: US 11,092,703 B2
(45) Date of Patent: Aug. 17, 2021

(54) RING-COUPLED CAVITY RESONATOR

(71) Applicant: Brock Franklin Roberts, Albuquerque, NM (US)

(72) Inventor: Brock Franklin Roberts, Albuquerque, NM (US)

( * ) Notice: Subject to any disclaimer, the term of this patent is extended or adjusted under 35 U.S.C. 154(b) by 0 days.

(21) Appl. No.: 15/932,798

(22) Filed: Apr. 25, 2018

(65) Prior Publication Data
US 2020/0348428 A1    Nov. 5, 2020

(51) Int. Cl.
*G01T 1/32*   (2006.01)
*H05H 7/18*   (2006.01)
*G21K 1/16*   (2006.01)

(52) U.S. Cl.
CPC .......... *G01T 1/32* (2013.01); *G21K 1/16* (2013.01); *H05H 7/18* (2013.01); *G21K 2201/068* (2013.01)

(58) Field of Classification Search
CPC ...... G01T 1/32; G21K 1/16; G21K 2201/068; H05H 7/18
See application file for complete search history.

(56) References Cited

U.S. PATENT DOCUMENTS

2016/0141743 A1* 5/2016 Roberts ............... H01P 7/06
 333/227
2016/0178601 A1* 6/2016 Harrison ............ G01N 22/00
 324/636

* cited by examiner

*Primary Examiner* — Mark R Gaworecki

(57) ABSTRACT

Spin polarized beams are an essential tool in the study of nuclear physics using particle accelerators. Particle accelerators can produce spin polarized beams, but a technology is needed to continuously monitor, in real time and non-invasively, the beam's polarization direction and quality. Without this capability, there is no way to automate polarization quality optimization. The ring-coupled cavity resonator provides a mechanism to enhance the interaction between a cavity resonator and the spin of passing particles, and provides a method to determine and monitor, in real time and non-invasively, beam magnetization and longitudinal spin polarization direction and quality.

1 Claim, 2 Drawing Sheets

RING-COUPLED CAVITY RESONATOR

CROSS REFERENCE TO RELATED APPLICATIONS

This application claims the benefit of provisional patent, Ser. No. 62/602,524, filed by Brock F. Roberts.

FEDERALLY SPONSORED RESEARCH

This invention has been reduced to practice thanks to the Department of Energy's Office of Science, Nuclear Physics program, and the Small Business Innovative Research program, grant number DE-SC0017120.

BACKGROUND

Spin polarized beams are an essential tool in the study of nuclear physics using particle accelerators. Particle accelerators can produce spin polarized beams, but a technology is needed to continuously monitor, in real time and non-invasively, the beam's polarization direction and quality. Without this capability, there is no way to automate polarization quality optimization. Experimentalists and theorists have sought a resonant structure for a non-invasive and real time solution, but have been hindered by the low power exchange between the magnetic field of charged particle bunches due to their spin, and the resonant cavities they pass through. The ring-coupled cavity resonator provides a mechanism to enhance the interaction between a cavity resonator and the spin of passing particles, and provides a method to determine and monitor, in real time and non-invasively, beam magnetization and longitudinal spin polarization direction and quality.

Advantages

The ring-coupled cavity resonator is sensitive to the local magnetic field of bunched beams, enabling beam magnetization and longitudinal spin polarization direction and quality to be non-invasively measured and monitored in real time.

DRAWINGS

FIG. 1 is a conceptual illustration of the interaction between the ring coupled cavity resonator, the longitudinal dipole magnetic field of passing particle bunches, the cavity's induced resonance, and an antenna for resonance detection. The magnetic field of passing bunches induce a current in the ring coupler/drive antenna, extracting energy from the beam. The conductive ring is situated in the cavity to act as a drive antenna for a cavity resonance. The current induced in the ring drives the resonance. Detection of the cavity resonance is made from an antenna in the cavities wall. Measurement of the magnitude of the resonance is a measure of the total magnetic field of the beam. Measurements of the difference of the magnitude and phase of the resonance as the beams spin orientation is modulated determines the longitudinal polarization direction, polarization quality, and beam magnetization. Measurement of the cavity's resonance with respect to the accelerators clock, a technique called quadrature demodulation, is sensitive to small changes in the amplitude and phase of the resonance. The elements of a quadrature demodulator are depicted in FIG. 1 as a source at the bunch rate $F_{bunch}$ and I and Q mixers.

The beam's bunches are depicted as tiny bar magnets in FIG. 1 because the dipole magnetic field distribution of a bar magnet is similar to the fields around a longitudinally spin aligned bunch, and is also similar to the field around a bunch with bulk rotation of charges around the beam axis. The dipole magnetic field strength in these cases reduces in magnitude with distance cubed, making the interaction between these fields and the ring coupler/drive antenna greater than their interaction with the conductive walls of the cavity.

The well-known physics demonstration of dropping a bar magnet down the bore of a vertical copper pipe and waiting . . . and waiting . . . for it to fall out, is similar to the interaction between the bunched beams magnetic dipole field and the ring coupler/drive antenna shown in FIG. 1. As the bar magnet in the demonstration slowly falls through the pipe, current is induced in the pipe, in front of and behind the magnet. Current in front of the magnet has a repulsive field that opposes the progress of the magnet; the current in the back creates an attractive force that shares in slowing the magnet down. The work done by the falling magnet is transferred into the current in the pipe and is extracted from the magnets forward motion. The dipole field of a bar magnet is localized, and decreases with cube of distance from it. For this reason if the diameter of the pipe were increased much, the magnet would nearly freefall.

The interaction between the longitudinally spin polarized bunched beam and or magnetized beam and the ring coupler/drive antenna is similar to the physics demonstration described. As longitudinally polarized or magnetized bunches pass through the ring, current is induced in the ring, repelling the bunches as they enter, and attracting them as they leave, extracting power from the beams forward motion. The induction is described by Faradays law, and the induced current direction is described by Lenz's law, and provides a mechanical force that opposes the passage of the bunch.

The coupler ring/drive antenna is located within a cavity resonator along the beam's axis where the current induced in it by the magnetic field of passing particle bunches is coupled to an axially symmetric transverse electric resonant cavity mode. The $TE_{011}$ resonant cavity mode is depicted in FIG. 1, and is the mode exploited in the embodiment in FIG. 2. This mode's magnetic field maximum is located in the center of the cavity, a location that is ideal for a drive antenna. The current induced in the ring by the magnetic field of a passing charge bunch drives the cavity resonance. Because the cavity mode and the ring current are coupled, as the resonance grows, so does the ring's current. Larger ring currents increase the oppositional forces on the bunches, and increase the steady state power extracted from the beam. The ring-coupled cavity resonator is sensitive to both spin polarization and beam magnetization, the bulk charged particle rotation about the accelerators axis; measurements of longitudinal spin orientation and beam magnetization can be made simultaneously.

The $TE_{011}$ mode has several beneficial characteristics. It's electric and magnetic fields are orthogonal to the electromagnetic fields of the beam, making the mode insensitive to the charge of the passing bunch. The orientation of the resonance's magnetic field is the same as the magnetic fields induced by currents in the ring coupler/drive antenna. The electric fields of the $TE_{011}$ mode resemble hula hoops perpendicular to and centered on the cavity axis/beam line, and the wall currents that support this mode are purely azimuthal.

DRAWINGS FIGURE

REFERENCE NUMERALS IN DRAWING

Figure 1:
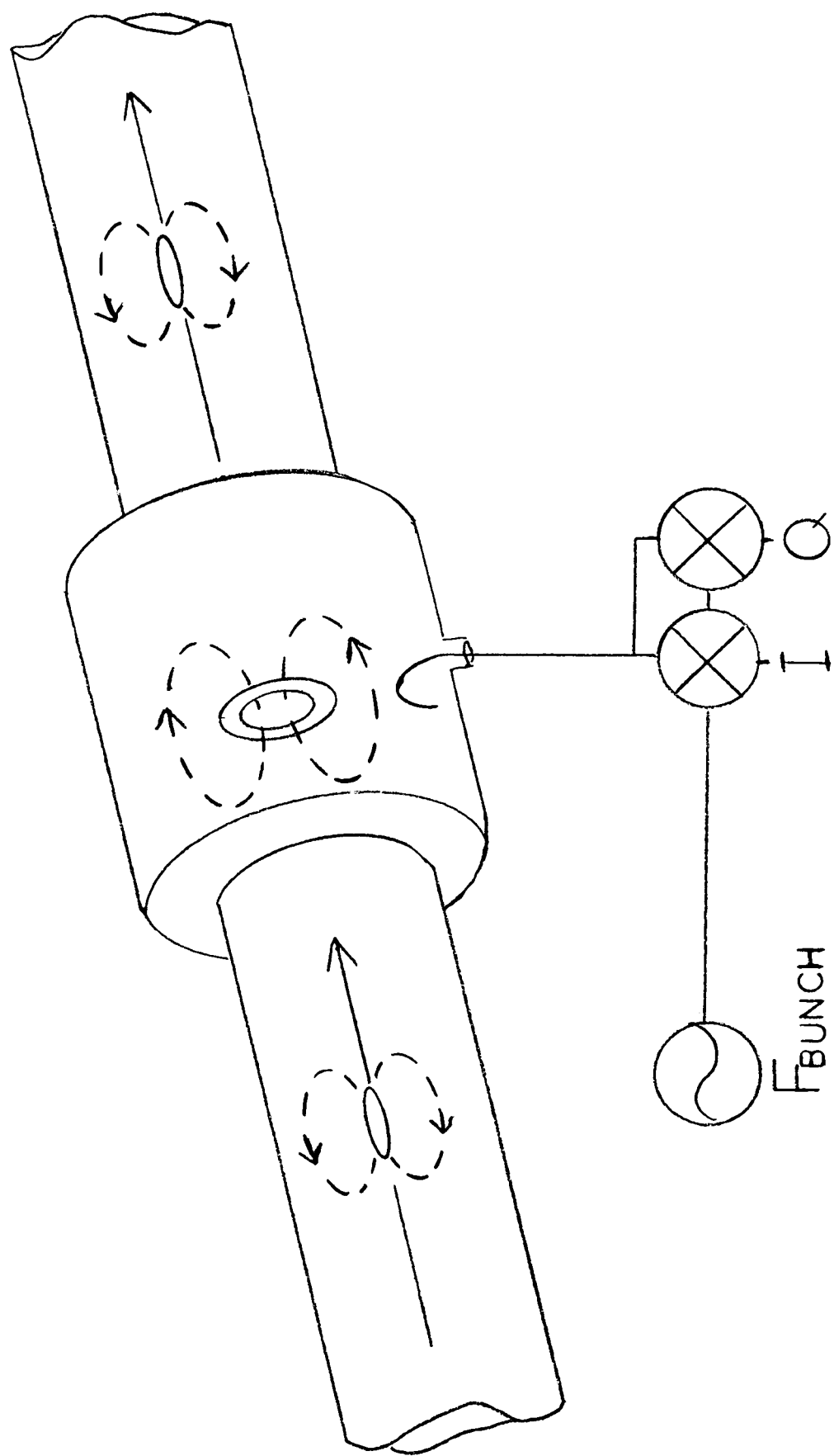
FIG. 1 is a conceptual illustration of the interaction between the ring coupled cavity resonator and the magnetic field of a particle bunch with longitudinal spin polarization or bulk magnetization.

1. Vacuum flange adapters
2. Vacuum enclosure nipple
3. Coaxial vacuum feed through
4. Antenna
5. Antenna mounting hardware
6. Ring coupler/drive antenna
7. Ring coupler/drive antenna support
8. Cavity wall segments
9. Spacers
10. Cavity end walls
11. Support rods
12. Rod fasteners

DESCRIPTION OF THE INVENTION

Figure 2:
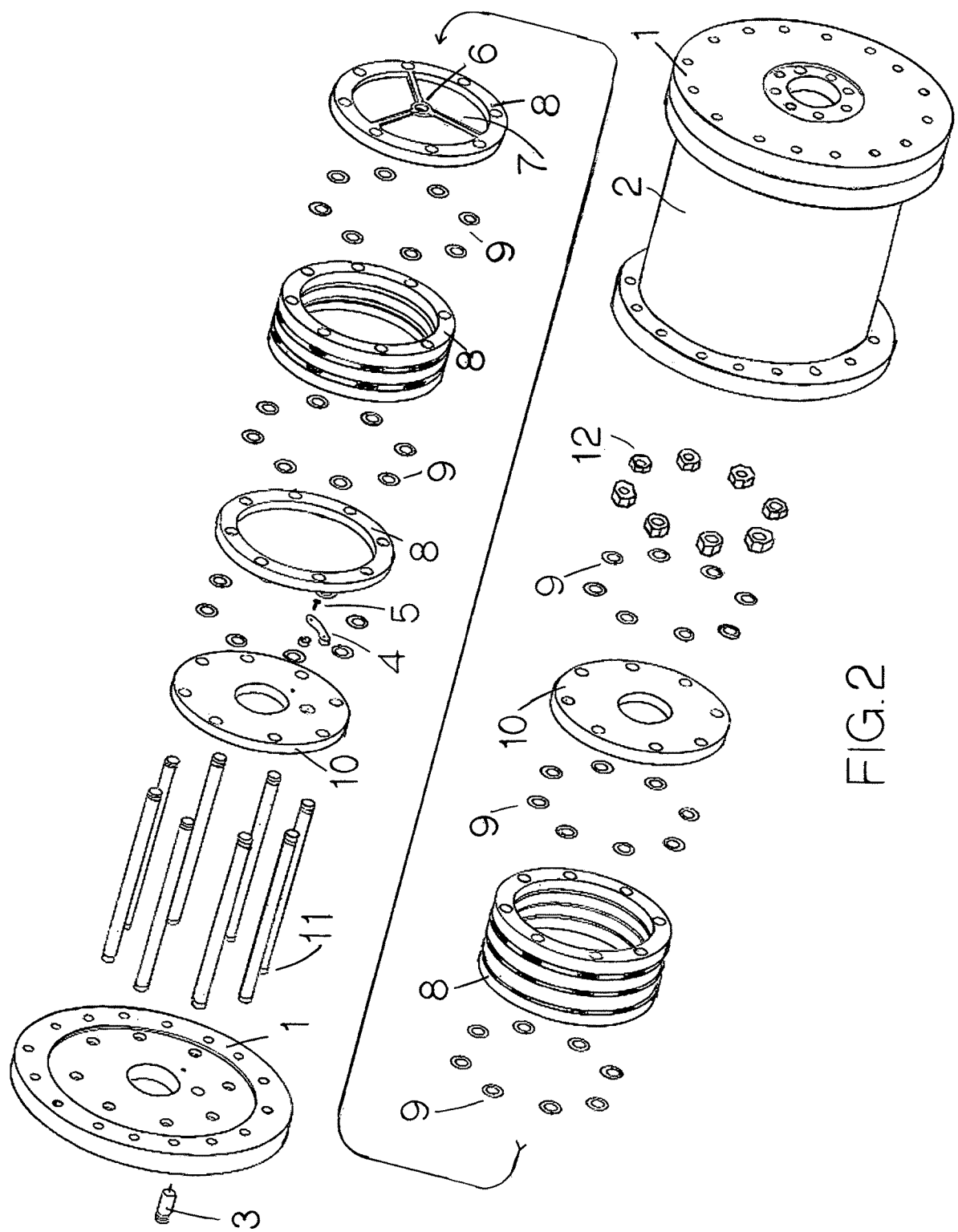
FIG. 2 is an exploded view of an embodiment of the invention.

The ring-coupled cavity resonator assembly is enclosed within a vacuum vessel that is comprised of two vacuum flange adapters (1) and a vacuum enclosure nipple (2). The two vacuum flange adapters (1), adapt the nipple's flange size to the to the beam pipe's flange size and back again, providing, with the nipple, a vacuum enclosure for the ring coupled cavity resonator. A coaxial vacuum feedthrough (3) penetrates the vacuum enclosure and provides a radio frequency/microwave connection to the cavities antenna (4). Antenna mounting hardware (5) provides the antenna support from within the cavity, and can be metallic or non-metallic depending on the antenna design. The ring coupler/drive antenna (6) is metallic and is supported to allow passage of the beam through it by the ring coupler/drive antenna support (7). The ring coupler/drive antenna support can be metallic or non-metallic depending on its geometry. FIG. 2 shows support spokes that are orthogonal to the electric field of transverse electric modes and can be metallic or non-metallic without detrimentally effecting the operation of $TE_{011}$ mode. Because the wall currents that support the $TE_{011}$ mode are purely azimuthal, the resonant cavity in this embodiment is defined by the inside surface of a stack of flat cavity wall segments (8) that are insulated from one another by spacers (9), and the cavity end walls (10). Electrically insulating spacers disrupt TM modes by preventing the wall current that support them, and microwave absorbing spacers can prevent additional cavity modes from potential interaction with the beam.

Support rods (11) are attached to a vacuum flange adapter, and the cavity assembly is captured with rod fasteners (12). Compression of the assembly with these fasteners can be used for fine tuning the frequency of resonance.

Operation of the Invention

In operation, the ring coupled cavity resonator is integrated into a beam line so that a bunched beam passes through the ring coupler/drive antenna that is positioned within the resonant cavity. The operational frequency of the cavity is selectable by the size and shape of the cavity. The resonant frequency of the cavity can be selected to be any frequency component of the ring current that is induced by the passing bunches. In the case of a beam bunch magnetometer, the cavities resonance frequency could be a harmonic of the bunch frequency. Measurement of the amplitude of the cavities resonance is a measurement of the beams total magnetization. Measurements of the difference of the magnitude and phase of the resonance as the beams spin orientation is modulated can be used to determine the longitudinal polarization direction, polarization quality, and beam magnetization simultaneously. To increase the sensitivity of longitudinal polarization measurements, the cavities resonant frequency can be selected to detect a more subtle frequency component within the ring's current, including bunch polarization modulation, or a modulation sideband induced by polarization modulation.

The coaxial vacuum feedthrough (3) and antenna (4) are used to exchange signals to and from the cavity resonator. A sensitive receiver could be used to measure low power signals. A phase sensitive quadrature demodulator or I/Q receiver could be used to measure changes in the relative phase and amplitude of the cavity resonance as compared to the accelerators clock as the beams spin orientation is modulated. Additionally, the feedthrough and antenna could be used to actively drive a mode to interact with the beam, or to increase the power of signals extracted by the beam by influencing the ring current.

I claim:

1. An apparatus for measuring the spin orientation and magnetization of charged particle beams, comprised of a cavity resonator with a bore for the passage of the beam to be measured; and a conductive ring positioned coaxially within the bore of said cavity resonator for the passage of the beam to be measured, whereby the interaction of the beam passing through the conductive ring couples to a resonance in the cavity resonator; and an antenna coupled to the cavity's resonance for measurement of its amplitude and phase.

* * * * *